United States Patent [19]

Ishihara

[11] Patent Number: 5,490,729
[45] Date of Patent: Feb. 13, 1996

[54] BALL SPLINE

[75] Inventor: Toyohisa Ishihara, Seki, Japan

[73] Assignee: Nippon Thompson Co., Ltd., Tokyo, Japan

[21] Appl. No.: 451,657

[22] Filed: May 30, 1995

[30] Foreign Application Priority Data

Jul. 12, 1994 [JP] Japan .................................. 6-181978

[51] Int. Cl.$^6$ ...................................... F16C 29/06
[52] U.S. Cl. ................................. 384/43; 384/45
[58] Field of Search ......................... 384/43, 45

[56] References Cited

FOREIGN PATENT DOCUMENTS 50-66057 6/1975 Japan.
58-52317 4/1983 Japan.
361046 10/1991 Japan.

Primary Examiner—Thomas R. Hannon
Attorney, Agent, or Firm—Browdy and Neimark

[57] ABSTRACT

This ball spline has a structure in which the raceway grooves can be made in a slider with ease and with a high accuracy by employing a raceway groove forming technique used in a linear rolling bearing. A casing in the slider has an opening extending over the full longitudinal length thereof and used for saddling the casing on a ball spline shaft. The outer surface of the casing is provided with a working reference plane which is used when the raceway grooves are formed in the inner surface of the opening. The casing can be fitted in a circular bore of a housing, and has arcuate surface portions on its outer surface which can support the inner circumferential surface of the circular bore of the housing. The axis of the ball spline shaft is offset from that of the circular bore of the housing.

8 Claims, 12 Drawing Sheets

BALL SPLINE

BACKGROUND OF THE INVENTION

1. Field of the Invention

This invention relates to a ball spline so formed that a slider can be moved slidingly on a ball spline shaft, which has longitudinally extending raceway grooves, via a plurality of rolling elements.

2. Description of the Prior Art

Conventionally, a ball spline has been the one in which an outer cylinder having a plurality of balls is moved along a ball spline shaft, and it has been applied to an industrial robot and a transfer machine. Known ball splines include a ball spline having thereon retainers for holding balls, and a ball spline having no retainers.

A ball spline having no retainers is provided as shown in FIG. 19 with a ball spline shaft 3 having axially extending raceway grooves 2 in predetermined portions of an outer circumferential surface thereof, and a hollow outer cylinder having a bore where the ball spline shaft 3 is fitted. The outer cylinder 70 is provided, in an inner circumferential surface of the bore thereof, with raceway grooves 71 which are opposed to the raceway grooves 2 in the ball spline shaft 3, and return passages 72. The ball spline further has spacer rings 74 provided with direction change passages 73, end caps 75, end seals 76 and balls 7 fitted between the opposed raceway grooves. The spacer rings 74, end caps 75 and end seals 76 constitute a slider 78, and are fixed to both ends of the outer cylinder 70 with bolts 77. The width of the window at the edges in cross section of each of the raceway grooves 71 in the outer cylinder 70 is smaller than the diameter of each ball 7 so as to retain the balls 7 (refer to, for example, Japanese Patent Publication No. 61046/1991).

A ball spline having a retainer comprises, as shown in FIG. 20, a ball spline shaft 3 having longitudinally extending raceway grooves 2 in predetermined portions of an outer circumferential surface thereof, and a slider 79 slidable on the ball spline 3. The slider 79 includes an outer cylinder 82 having in the inner surface raceway grooves 80 opposed to those 2 in the ball spline shaft 3, and inclined surface portions 81 for changing the direction of movement of the balls 7; and a retainer 83 for retaining the balls 7 on the inner surface of the outer cylinder 82. The retainer 83 comprises a thin-walled seamless cylinder having a large diameter at the portion which corresponds to the balls 7 in a no-load region of a return passage 84 in the retainer 83, and a small diameter at the portion which corresponds to the balls 7 in a load region of the raceway grooves 80. The retainer 83 is provided with an elongated recess so that the balls 7 rolling in the load region project slightly. The retainer 83 is fixed to the outer cylinder 82 by screwing nut covers 86 on both sides of the inner circumferential surface of the outer cylinder 82 (refer to, for example, Japanese Utility Model Laid-Open No. 52317/1983).

There has been also known a ball spline in which two sliders 88, 88 are provided axially in series on a ball spline shaft as shown in FIGS. 21 and 22. The ball spline shaft 3 is a hollow shaft, which is provided with a pair of raceway grooves 2 formed symmetrically with respect to the axis thereof. Each slider 88 has an outer cylinder 89 provided with race ways opposed to those 2 in the ball spline shaft 3, disc type end caps 90 provided on both axial ends of the outer cylinder 89, and side seals 91 attached to the sides of the end caps 90 which are opposite to the sides in contact with the outer cylinder (casing).

A linear ball-and-roller bearing the construction of which is similar to that of a ball spline has as shown in FIG. 23 a track rail 93 provided with raceway grooves 92 in both of longitudinally extending side surfaces thereof, a casing 95 slidable relatively to the track rail 93, and provided with raceway grooves 94 in the portions which are opposed to the raceway grooves 92, a pair of end caps fixed to both of longitudinal ends of the casing 95, balls 7 rolling circulatingly between the opposed raceway grooves, side seals provided on the outer end surfaces of the end caps, and lower seals so provided as to be opposed to both sides of the rail 93. In the linear ball-and-roller bearing, the raceway grooves 94 in the casing 95 constituting a slider are formed by precision grinding using large-diameter grindstones 96 as shown in FIG. 24, so that the raceway grooves 94 can be formed with a high accuracy.

There is a linear bearing (refer to Japanese Utility Model Laid-Open No. 66057/1975) shown in FIG. 25, the construction of which is intermediate between those of the ball spline shown in FIGS. 19–22 and the linear ball-and-roller bearing shown in FIG. 23. A rail 97 in this linear bearing has a cross-sectional shape very similar to that of the track rail 93 of a linear rolling guide unit. A slider has spline nuts 98 each of which is formed by cutting a portion of an outer cylinder at 120°, and a mount 99 placed on the spline nuts 98. Each spline nut 98 is provided in its inner surface with raceway grooves 101 opposed to those 100 in the track rail 97 so that balls 7 roll between the raceway grooves 100, 101. The convex outer circumferential surfaces of the spline nuts 98 are in conformity with the concave inner circumferential surface of the mount 99, and have an automatic aligning performance.

Although the ball spline shown in FIG. 19 is provided with ball retaining portions on side edges of the raceway grooves 71 in the outer cylinder 70, it is very difficult to form raceway grooves 71 having ball-retaining portions. The raceway grooves in this ball spline cannot be formed by using large-diameter grindstones unlike those in the linear ball-and-roller bearing. Consequently, the raceway grooves 71 in the inner surface of the outer cylinder 70 is necessarily formed by broaching, hardening and finishing such as polishing. Therefore, it is difficult to finish the ball spline, and the manday is great. Since the raceway grooves in the inner surface of this outer cylinder 70 are formed by broaching, there is a limit to the axial length of the cylinder with respect to the inner diameter thereof, so that an outer cylinder of a large length cannot be manufactured. Accordingly, a combination of two or more sliders 88, 88 are used as shown in FIG. 21. It is also difficult in the ball spline to form the ball load regions of the raceway grooves 71 in the outer cylinder 70, and direction change passages 73 in the spacer rings 74 and side rings 75 with a high accuracy.

In the ball spline shown in FIG. 20, the raceway grooves 80 in the outer cylinder 82 are provided at both axial end parts of the ball load regions with escape portions formed of inclined grooves for guiding the balls 7 moving in the direction change passages 87 in the retainer 83, so that it is difficult and expensive to form the raceway grooves 80. The outer cylinder 82 to which the retainer 83 is fixed in a conventional ball spline has difficult points in the forming of the raceway grooves therein by broaching and finishing the raceway grooves very precisely. Forming attaching parts, to which the retainer 83 is attached, on the outer cylinder 82 is also troublesome, and the cost of manufacturing the outer cylinder 82 increases.

The linear bearing shown in FIG. 25 involves a problem that the track rail 97 is heavier than that of the ball spline shaft in the ball spline. The spline nuts 98 constituting a slider and formed by cutting a portion of the outer cylinder in the ball spline at 120° does not have a working reference plane, so that it is difficult to form the raceway grooves 101 with a high accuracy.

SUMMARY OF THE INVENTION

A primary object of the present invention is to solve these problems, and provide a ball spline constructed by forming an opening in a slider slidable on and relatively to a ball spline shaft, cutting a part of the slider over the whole axial length thereof so that the slider has a substantially C-shaped cross section and saddles the ball spline shaft providing a working reference plane on the outer surface of an outer cylinder in the slider, whereby it is made possible to apply a method of forming raceway grooves in a casing of a linear rolling guide unit to even a ball spline, improve the ball spline finishing accuracy by facilitating the formation of the raceway grooves in the outer cylinder, reduce the ball spline manufacturing cost, and minimize a decrease in a housing supporting area of the slider in spite of the provision of the working reference plane on the outer cylinder.

Another object of the present invention is to provide a ball spline comprising a cross-sectionally circular ball spline shaft of a circular cross-section provided with a pair of first raceway grooves extending longitudinally in the outer surface thereof; a casing fitted on the ball spline shaft and provided with second raceway grooves extending longitudinally in the inner surface thereof in such a way as to be opposed to the first raceway grooves, and return bores so formed inside thereof as to be spaced from the second raceway grooves; rolling elements rolling between the first and second raceway grooves; retainers retaining the rolling elements together with the casing; end caps having direction change passages communicating with the second raceway grooves and return bores and provided on both ends of the casing; and side seals provided on the end surfaces of the end caps. The casing, rolling elements, retainers, end caps and side seals constituting a slider. The casing is provided with an opening extending over the full longitudinal length thereof, and saddling the ball spline shaft, and a working reference plane which is used when the second raceway grooves are formed, and which is provided on the outer surface which is on the opposite side of the opening.

The casing is fitted fixedly in a through bore of a hollow housing, and arcuate surface of the outer surface of the casing is supported on the inner circumferential surface of this through bore, and the arcuate surface extends to a plane passing the axis of the housing.

The ball spline can be so formed that the axis of the ball spline shaft and the axis of the through bore of the housing are offset from each other.

The ball spline can otherwise be so formed that the axis of the ball spline shaft and the axis of the through bore of the housing are aligned with each other and it has a support portion, which is supported on the inner circumferential surface of the through bore of the housing, provided on the central portion of the working reference plane.

This ball spline has in the casing an opening extending over the full longitudinal length thereof, and, moreover, a working reference plane used when the second raceway grooves are formed. Therefore, the method of forming raceway grooves in a linear rolling guide unit, not the conventional broaching method, can be applied to the formation of the second raceway grooves in the casing by using large-diameter grindstones. Therefore these second raceway grooves can be formed by grinding with ease and with a high accuracy. Moreover, this ball spline can have a long slider and this decreases the number of the sliders mounted on the ball spline shaft. Since the working method employed for manufacturing a linear rolling guide unit can be applied to this ball spline, the raceway grooves in the slider can be formed by only hardening a drawn material and thereafter grinding the material hardened, so that the manday and manufacturing cost can be minimized.

Since a slider in a conventional ball spline is formed cylindrically, the forming of raceway groves therein is done by broaching. Accordingly, there is a limit to the axial length of the slider with respect to the inner diameter thereof. Namely, a slider of a large length cannot be produced, so that a plurality of sliders are used by arranging them axially in series. Since the raceway grooves in a conventional slider are formed by broaching, hardening and then finishing, e.g. polishing the material, the manday is great.

The casing is fitted fixedly in the through bore of the housing, and has arcuate surface, which can be supported on the inner circumferential surface of the through bore of the housing, on the outer surface of the casing. Accordingly, the circumferential position in which the casing and housing are assembled, i.e. the relative angle can be regulated.

The supporting area of the housing-supporting casing can be increased by offsetting the axes of the ball spline shaft and through bore of the housing from each other, and this enables the casing to be set in the housing stably.

When the axis of the ball spline shaft and that of the through bore of the housing are set in alignment with each other, the support part supported on the inner circumferential surface of the through bore of the housing is provided on the central portion of the working reference plane, whereby it is possible to increase the area of the support part of the casing at which the casing is supported on the housing and also the load capacity. Accordingly, this ball spline can have a structure having a smaller axial cross section.

DESCRIPTION OF THE PREFERRED EMBODIMENTS

The embodiments of the ball spline according to the present invention will now be described with reference to FIGS. 1–18. First, the first embodiment of the ball spline will be described with reference to FIGS. 1–14.

Figure 1:
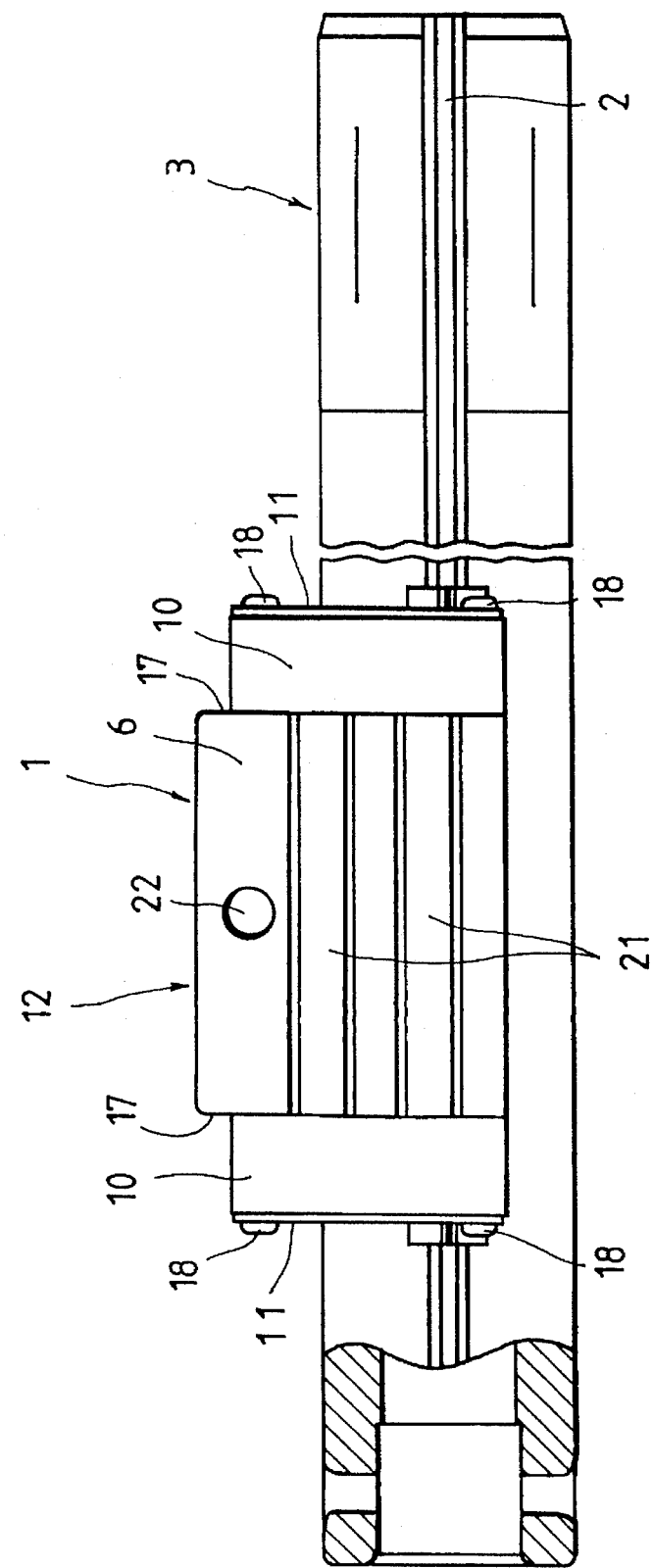
FIG. 1 is a partially cutaway front view of an embodiment of a ball spline according to the present invention.
Figure 2:
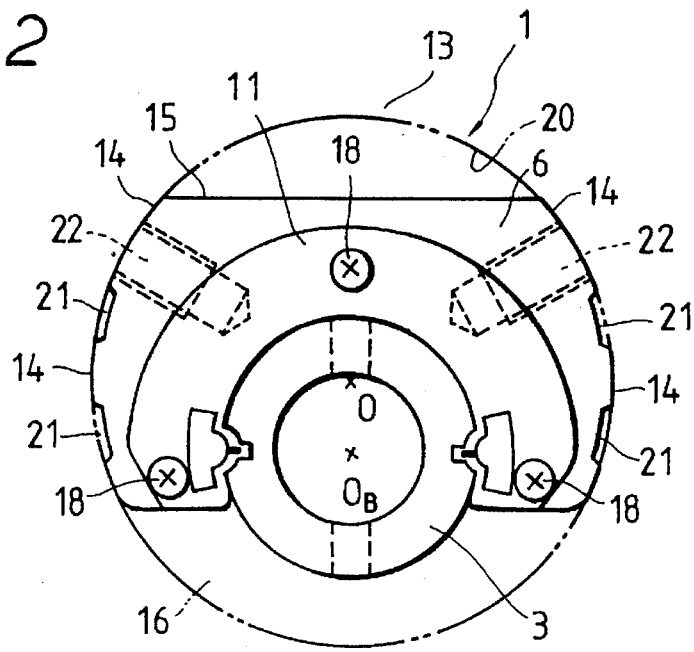
FIG. 2 is a side view of the ball spline of FIG. 1.
Figure 3:
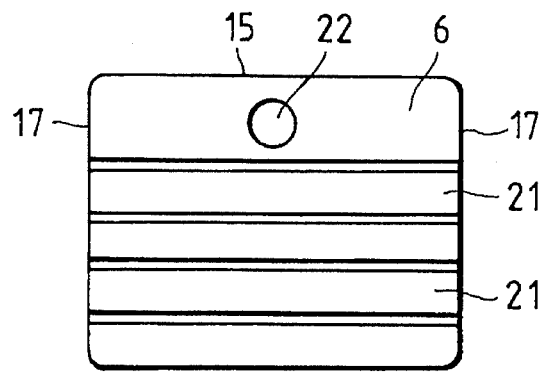
FIG. 3 is a front view showing a casing in the ball spline of FIG. 1.

The outline of the construction of this ball spline will be described with reference to FIGS. 1, 2, 3 and 4. This ball spline 1 is provided with a ball spline shaft 3 having a circular cross section and raceway grooves 2 (first raceway grooves extending longitudinally and formed in an outer surface thereof; a casing 6 which is so fitted on the ball spline shaft 3 as to saddle the same, and which has longitudinally extending raceway grooves 4 (second raceway grooves), which are opposed to the raceway grooves 2, in an inner surface thereof, and return bores 5 extending in parallel with and spaced from the raceway grooves 4 so as to form return passages; retainer strips 8 serving as retainers holding balls 7 rolling in the casing; end caps 10 which have direction change passages 9 communicating with the raceway grooves 4 and return bores 5, and which are attached to the end surfaces of the casing 6; and side seals 11 provided on the end surfaces of the end caps 10. A slider 12 includes the casing 6, end caps 10 and side seals 11, and is so disposed as to saddle the ball spline shaft 3 as shown in FIG. 2. The slider 12 is fitted fixedly together with the ball spline shaft 3 in a circular bore 20, which constitutes a through bore, in a housing 13.

Figure 4:
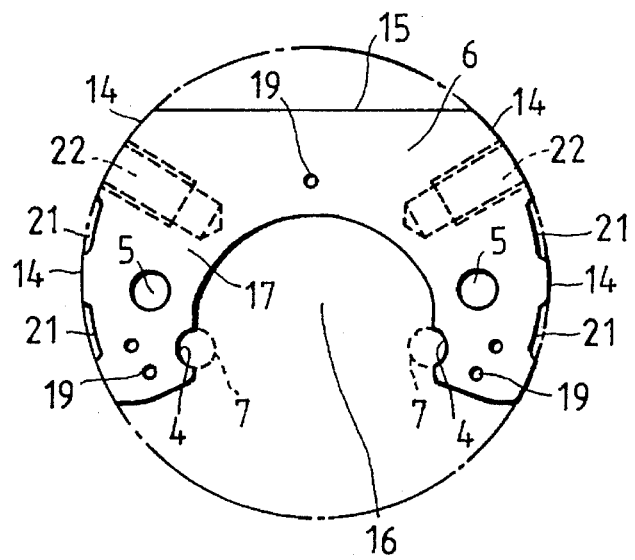
FIG. 4 is side view showing the casing of FIG. 3.

The casing 6 is a columnar body having a generally C-shaped cross section as shown in FIG. 4. The casing 6 has arcuate surface portions 14, 14 on both sides of the outer surface thereof, and a flat surface portion 15 at the central part of the outer surface. The casing 6 has an opening 16 extending over the full longitudinal length thereof. The casing 6 is provided, in the portions of its inner surface which are opposed to the raceway grooves 2 in the ball spline shaft 3, with axially, i.e. longitudinally extending cross-sectionally V-shaped or arcuate raceway grooves 4. The casing 6 is also provided with longitudinally extending return bores 5, which constitute return passages, and extend in parallel with the raceway grooves 4. Longitudinal end surfaces 17, 17 of the casing 6 are provided with holes 19 for bolts 18 to be inserted thereinto for fixing the end caps 10 and side seals 11 to the casing 6.

The casing 6 can be fitted in a circular bore 20 formed in the housing 13, and has arcuate surface portions 14, which are supported on the inner surface of the circular bore 20, on the outer surface thereof. The arcuate surface portions 14 of the casing 6 constitute support surfaces 14 supporting the housing 13. Since the casing 6 has arcuate surface portions 14, it is inserted easily into the circular bore 20 formed in the housing 13. The arcuate surface portions 14 of the casing 6 are provided with grounding escape recesses 21, whereby the support surfaces 14 of the casing 6 with respect to the housing 13 are divided into a plurality of parts, so that the directions of the vectors of the supporting forces thereof differ to enable the housing 13 to be supported stably. The arcuate surface portions 14 of the casing are provided with bores 22 for bolts for fixing the casing 6 to the housing 13. As shown in FIG. 2, these bores 22 extend toward the center, i.e. the axis of the circular bore of the housing 13.

Figure 24:
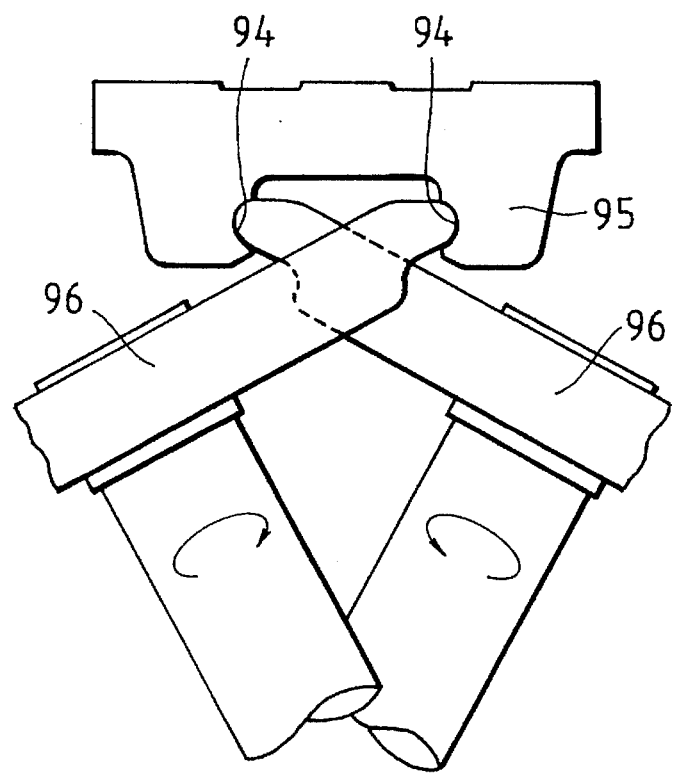
FIG. 24 is a schematic view showing a method of machining a slider in the linear rolling guide unit of FIG. 23.
Figure 25:
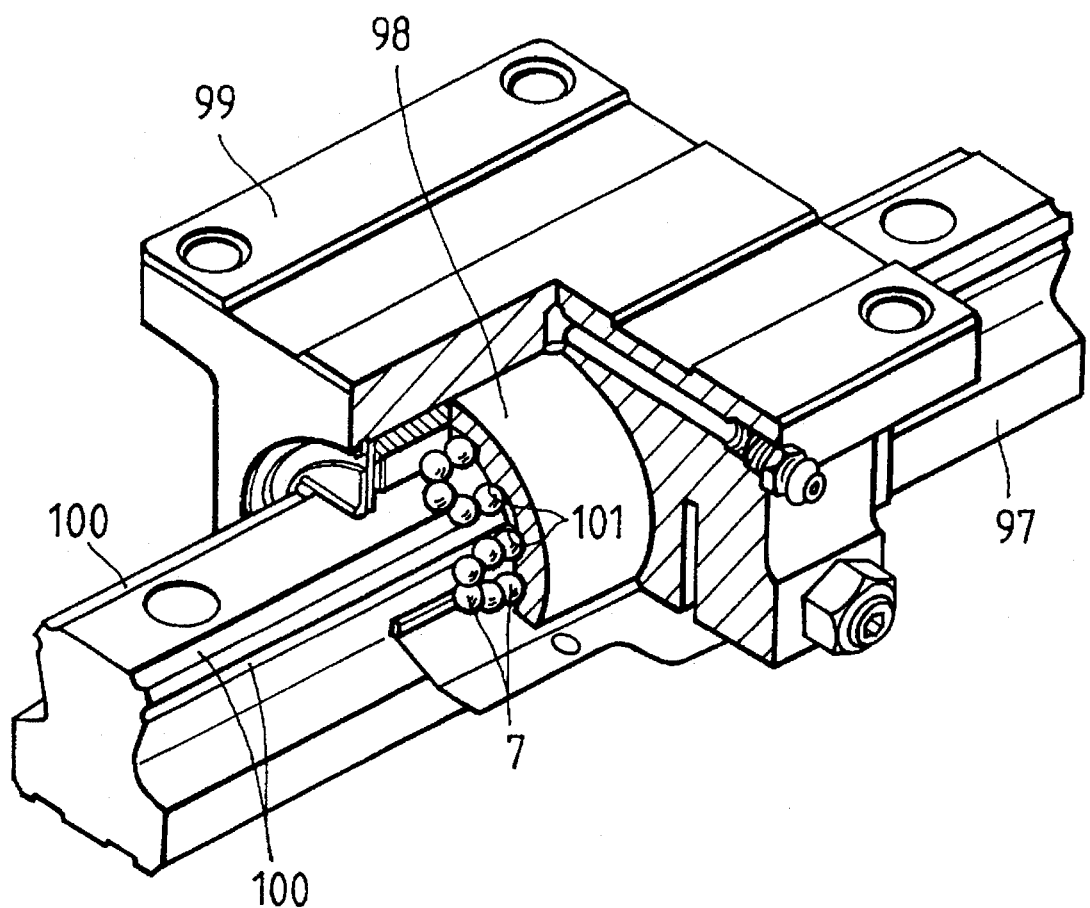
FIG. 25 is a partially cutaway perspective view showing a conventional linear bearing.

The flat surface portion 15 formed on the casing 6 constitutes a working reference plane used when the raceway grooves 4 are formed in the inner surface of the casing 6. Since the casing 6 has the opening 16 extending over the full longitudinal length thereof, the raceway grooves 4 can be formed in the inner surface by using raceway groove forming method employed in a linear rolling guide unit, i.e., these raceway grooves 4 can be formed by using larger-diameter grindstones 96 as shown in FIG. 24. Accordingly, the raceway grooves 4 can be formed with a high accuracy in even a casing 6 of a large length. The raceway grooves 4 in the casing 6 can be formed by only hardening a drawn material and thereafter grinding the resultant material, so that the manday and manufacturing cost can be minimized. Moreover, the accuracy of working the raceway grooves 4 is improved owing to this grinding, and the load capacity increases. Accordingly, the ball spline can be so formed as to have a structure having a smaller axial cross section.

Since the casing 6 has the flat working reference plane 15, the area of housing supporting surface portions thereof becomes smaller if the axis of the ball spline shaft and that of the circular bore of the housing are aligned with each other as in a conventional ball spline. However, in this embodiment, the axis $0_B$ of the ball spline shaft 3 and the axis O of the circular bore 20 of the housing 13 are offset from each other as shown in FIG. 2. Since the axis $O_B$ of the ball spline shaft 3 and the axis O of the circular bore 20 of the housing 13 are offset from each other, the area of the arcuate surface portion 14, the support surfaces for the housing can be increased. Namely, the support surface 14 for the housing 13 can be set large. In other words, the casing 6 is provided with the opening 16 extending over the full longitudinal length thereof, and saddling the ball spline shaft 3, and the working reference plane 15 which constitutes a reference plane used when the second raceway grooves 4 are formed, and which are formed on the outer surface of the casing 6 which is on the opposite side of the opening 16.

Figure 5:
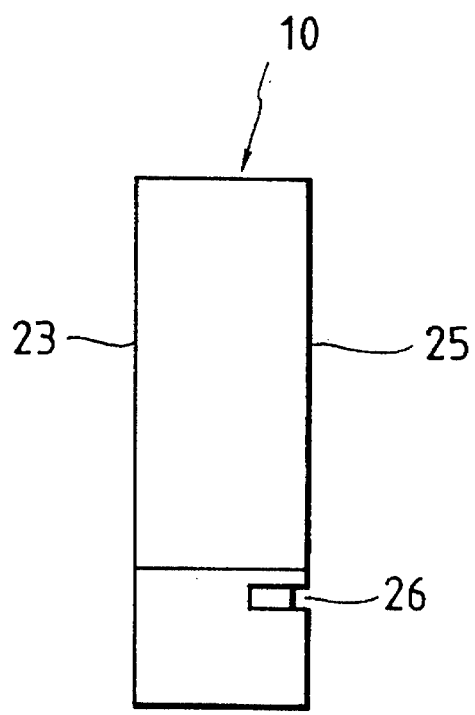
FIG. 5 is a front view showing an end cap in the ball spline of FIG. 1.
Figure 6:
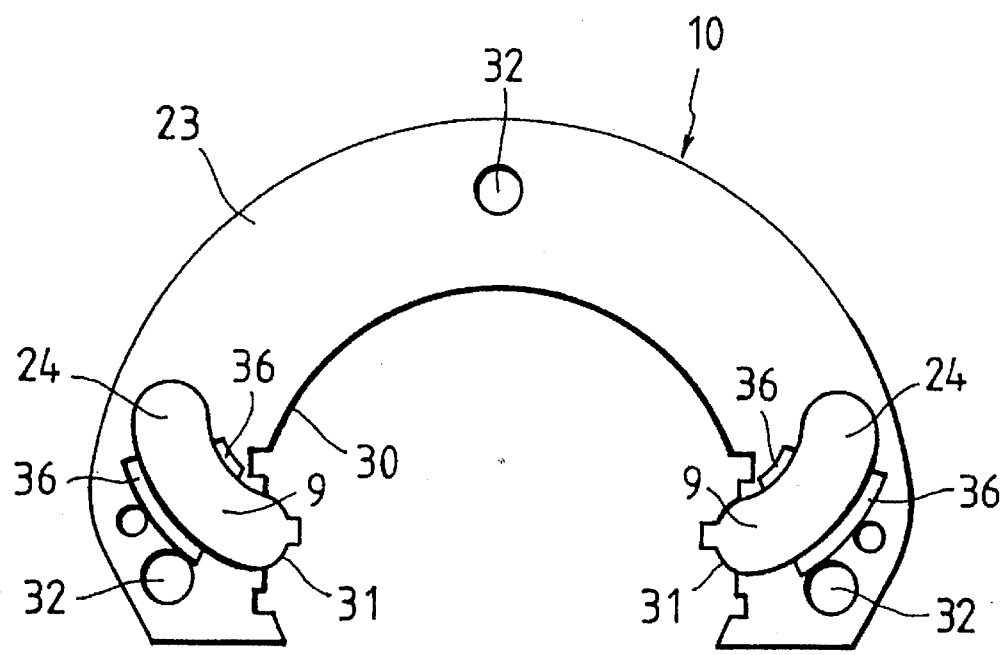
FIG. 6 is a rear view showing an inner end surface of the end cap of FIG. 5.
Figure 7:
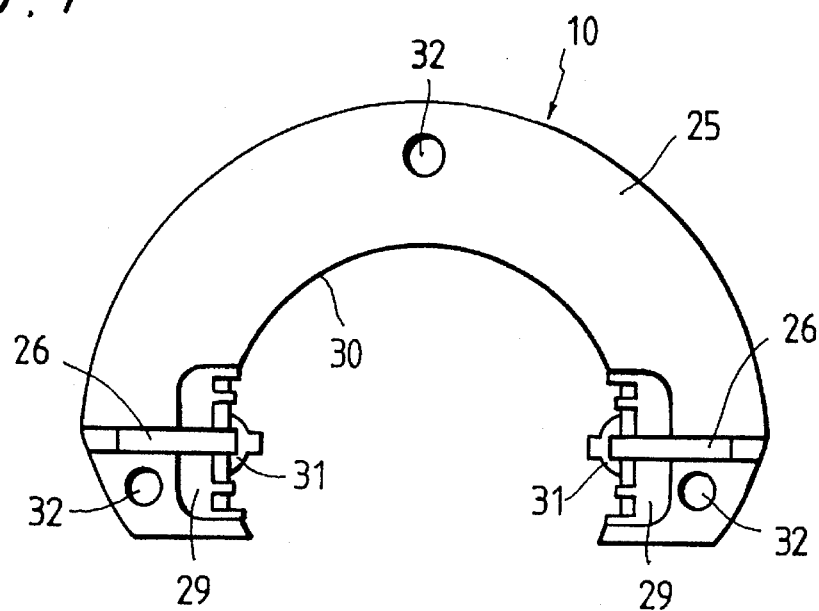
FIG. 7 is a side view showing an outer end surface of the end cap of FIG. 5.

Each end cap 10 is so formed as to have a generally C-shaped cross section as shown in FIGS. 5, 6 and 7, out of a synthetic resin or a metal. The inner side 23 of the end cap 10, i.e. the surface which contacts the casing 6 is provided with surface portions 24 of semicircular section defining the direction change passages 9. The outer side 25 of the end cap 10, i.e. the surface which is on the opposite side of the casing is provided with locking recesses 26, with which locking portions 27 of the retainer strip 8 are engaged. The outer side (25) of the end cap 10 is also provided with recesses 29 which the retainer plate 28 uses as a retainer is fixed. The locking recesses 26 are formed in the outer side 25 of the end cap 10, more deeply than the recesses 29. The depth of the locking recesses 26 is so large that the retainer strip 8 engaged therewith does not project from the outer side 25 of the end cap 10. The depth of the recesses 29 is also so large that the retainer plate 28 fixed thereto does not project from the outer side 25 of the end cap 10. The inner side 30 of the end cap 10 is provided, on the portions thereof which are opposed to the raceway grooves 2 formed in the ball spline shaft 3, with arcuate projections 31 engageable with these raceway grooves 2. The end cap 10 is provided, in three portions thereof, with holes 32 into which bolts 18 are inserted, and can be fixed to the casing 6 by inserting the bolts 18 into these holes 32 and tightening the same.

Figure 8:
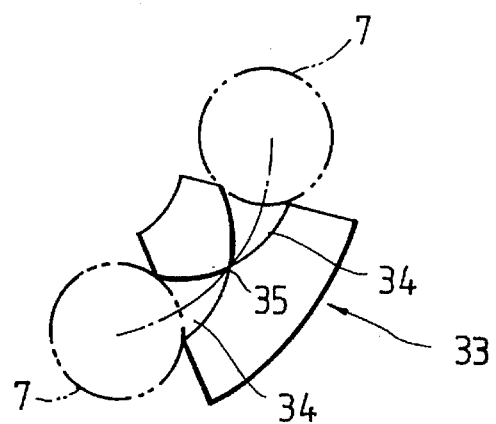
FIG. 8 is an explanatory view of a spacer in the ball spline of FIG. 1.
Figure 9:
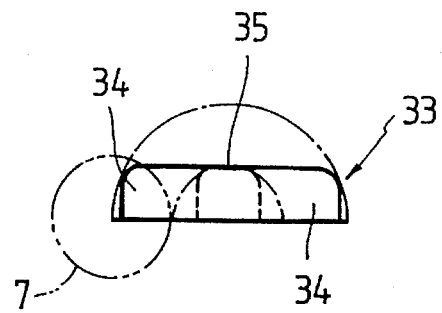
FIG. 9 is an explanatory view of the spacer of FIG. 8.

A spacer 33 shown in FIGS. 8 and 9 constitutes a direction change passage 9 together with a wall surface portion formed on the relative end cap 10. The spacer 33 is a generally sector-shaped plate member, in the surface of which recesses 34 are formed so that the recesses 34 extend along the track of the rolling balls 7. The recesses 34 are valleys along the tracks of the centers of the rolling balls 7, and the portion between the recesses 34 forms a ridge 35. The spacer 33 is fixed to the end cap 10 by fitting the spacer 33 in the sector-shaped recess 36 formed in the inner side 23 of the end cap 10. The fixing of the spacer 33 to the end cap 10 is done in such a way that the surface in which the recesses 34 are formed is opposed to the wall surface portion 24. The wall surface portions 24 formed on each end cap 10 and the wall surface of the recess 34 formed in each spacer 33 form the direction change passages 9.

The inner side 30 of each end cap 10 are provided with circular projections 31 engageable with the raceway 2 at a place opposed to the raceway grooves 2 formed in the ball spline shaft 3, and these projections 31 which extend from the surface portions 24 forming the direction change passages 9 can guide the balls 7 smoothly. An endless circulating passage in which the balls 7 rolls is formed by the raceway grooves 4 formed in the casing 6, direction change passages 9 defined by the surface portions 24 formed on the end caps 10 and the surfaces formed on the spacers 33, and the return bores 5 formed in the casing 6. The balls 7 can roll in this endless circulating passage smoothly.

Figure 10:
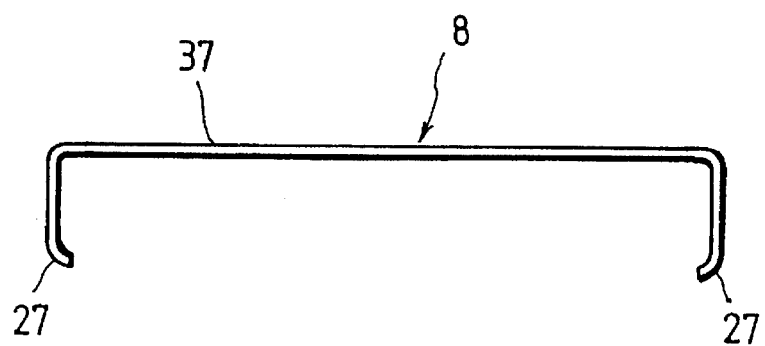
FIG. 10 is a plan view showing a retaining strip in the ball spline of FIG. 1.

The retainer strip 8 as a retainer which is shown in FIG. 10 is formed by bending a thin and long metal plate into a shape like a letter "U", and it is fixed to the casing 6 so as to prevent the balls 7 from coming off the raceway grooves 4 in the casing 6. Since the retainer strip 8 is formed by bending a thin and long metal plate, the production thereof can be carried out easily, and the manufacturing cost can be minimized. The retainer strip 8 includes a linear ball retaining portion 37 for retaining the balls 7 arranged in the raceway grooves 4 in the casing 6, and locking portions 27 formed by bending both ends of the ball retaining portion 37 so that the retainer strip 8 can be engaged with and fixed in the locking recesses 26 in the end cap 10. The retainer strip 8 is so disposed as to cross over the raceway grooves 4 by engaging the free locking portions 27 of the retainer strip 8 with the locking recesses 26 in the end cap 10. In this condition, a plurality of balls 7 arranged in the raceway grooves 4 in the casing 6 are held in the raceway grooves 4 so that the balls 7 do not come off.

Figure 11:
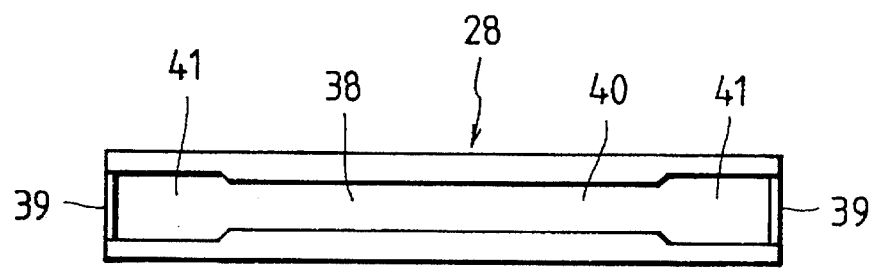
FIG. 11 is a front view showing a retaining plate in the ball spline of FIG. 1.

The retainer plate 28 as a retainer which is shown in FIG. 11 is obtained by forming an opening 38 in an a long rectangular plate, and by bending both ends of the retainer plate 28 at right angles to from fixing portions for fixing the retainer plate 28 to the corresponding end cap 10. Consequently, the production of the retainer plate 28 can be carried out easily, and the cost of producing the same can be minimized. The opening 38 includes a narrower portion 40 in the central part thereof, and wider portions 41 in both end regions thereof. The retainer plate 28 is fixed to the end cap 10 by fitting the fixing portions 39 in the recesses 29 in the outer side of the end cap 10. In the condition that the retainer plate 28 is fixed to the end cap 10, the narrower portion 40 in the retainer plate 28 is positioned on the inner surface of the casing 6, and the wider portions 41 on the inner surface of the end cap 10. Since the width of the narrower portion 40 is slightly smaller than the diameter of each ball 7, the balls 7 can be retained so that the balls 7 do not come off the casing 6. The width of the wider portions 41 is slightly larger than the diameter of each ball 7, and the projections 31 of the surface portions 24 forming the ball direction change passages 9 are fitted in the wider portions 41.

Since the outer side 25 of the end cap 10 is provided with the locking recesses 26 and recesses 29, both the retainer strip 8 and retainer plate 28 can be fixed to the end cap 10, but either the retainer strip 8 or the retainer plate 28 may be fixed to the end cap 10. It is possible to fix both the retainer strip 8 and retainer plate 28 to the end cap 10, and, in such a case, the retainer strip 8, in a fixed state, projects from the opening 38 of the retainer plate 28.

Figure 12:
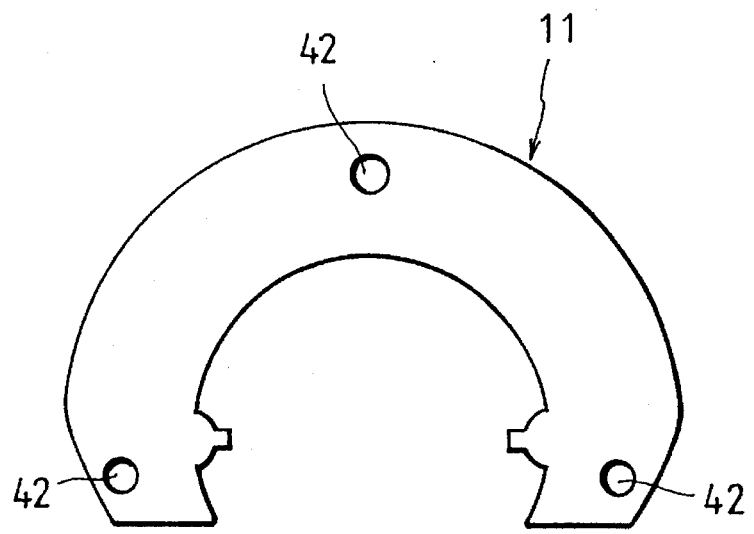
FIG. 12 is a side view showing a side seal in the ball spline of FIG. 1.

The side seal 11 shown in FIG. 12 is fixed to the axial end surfaces 25 of both end caps 10 so as to seal the slide contact portions between the end caps 10 and ball spline shaft 3, and made by fixing a seal member of an elastic material, such as rubber or a synthetic resin to a core metal of steel by baking. The side seal 11 is provided, at the portions thereof which correspond to the bolt holes 32 formed in the end cap 10, with bolt holes 42. The side seal 11 is fixed together with the end cap 10 to the casing 6 by tightening the bolts 18 inserted into the holes 42.

Figure 13:
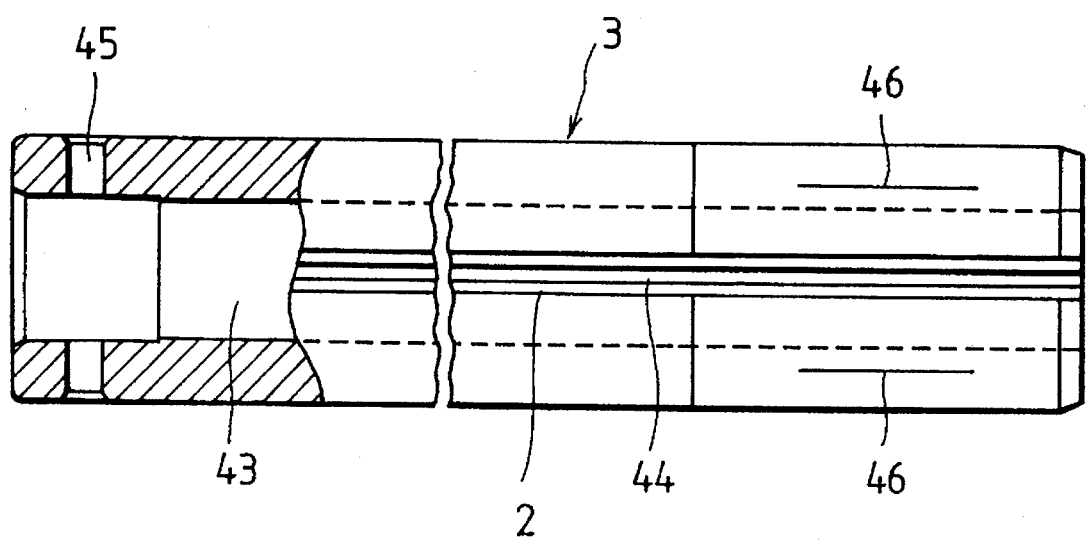
FIG. 13 is a partially cutaway front view of a ball spline shaft in the ball spline of FIG. 1.
Figure 14:
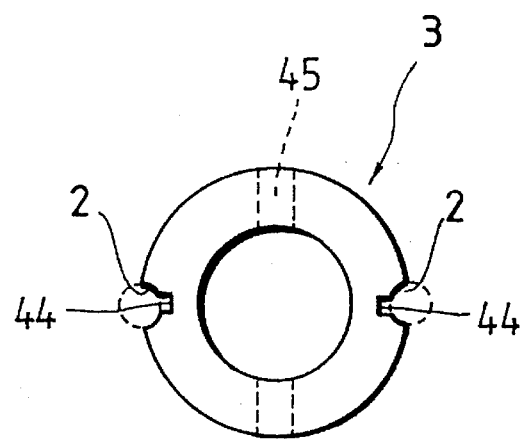
FIG. 14 is an end view showing the ball spline shaft of FIG. 13.

A ball spline shaft 3 shown in FIGS. 13 and 14 has a through bore 43, and it is further provided, in the portions of the outer circumferential surface which are symmetric with respect to the axis thereof, with a pair of longitudinally extending raceway grooves 2. Since the ball spline shaft 3 is a hollow shaft, it has a weight smaller than that of a track rail in a linear rolling guide unit. The raceway grooves 2 are formed in positions opposed to the raceway grooves 4 provided in the casing 6. The raceway grooves 2 are provided, in their bottom surfaces, with recesses 44 so that, when a slider 12 slides on the ball spline shaft 3, the ball retainer strips 8 do not slidingly contact the ball spline shaft 3. The ball spline shaft 3 is provided with bolt inserting bores 45 in one end portion thereof, and with projections in four positions on the other end portion thereof.

This ball spline 1 can be used for, for example, a sliding electric saw in which the sawtooth part is provided slidably relatively to a machine base. In such a sliding electric saw, the sawtooth part is fixed to one end of a ball spline shaft 3 via bolt bores 45, and a slider 12 which slides relatively to the ball spline shaft 3 is fixed in a circular bore 20 in a housing 13 of the machine base. A stopper is fixed to the other end of the ball spline shaft 3 via the projections 46, whereby the disengagement of the ball spline shaft having the sawtooth part from the slider 12 is prevented.

Figure 15:
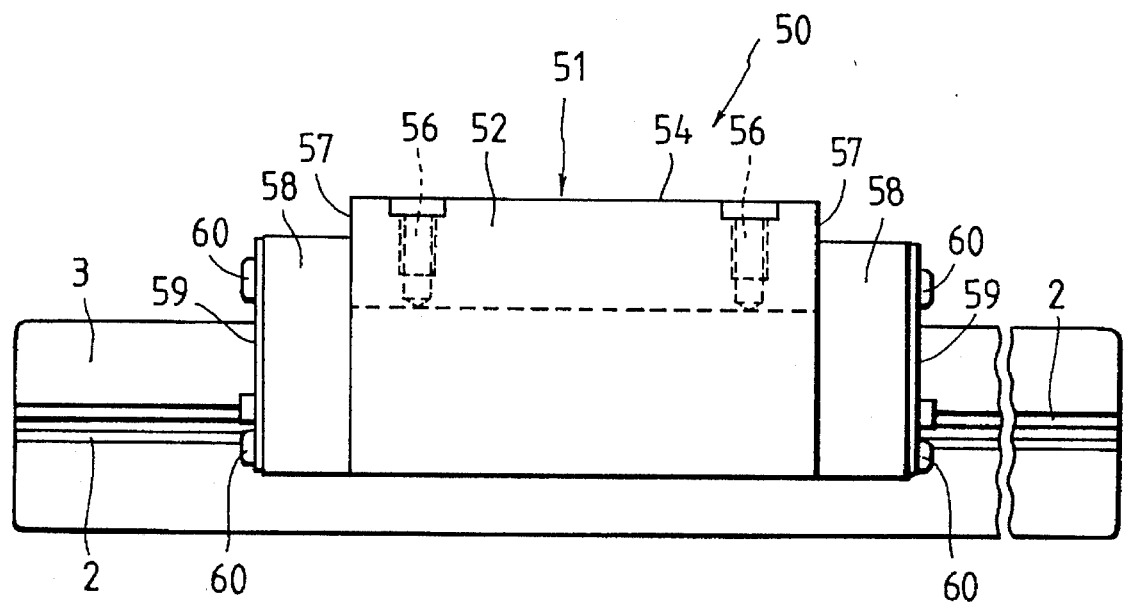
FIG. 15 is a front view showing a second embodiment of a ball spline according to the present invention.

A second embodiment of a ball spline according to the present invention will now be described with reference to FIGS. 15 and 16. FIG. 15 is a front view showing a ball spline, and FIG. 16 a side view showing the ball spline of FIG. 15. Although the construction of a slider 51 in a ball spline 50 of this embodiment is partially different from that of the slider 12 in the first embodiment, the construction of a ball spline shaft 3 of the second embodiment is identical with that of the ball spline shaft of the first embodiment.

A casing 52 of the ball spline 50 of the second embodiment has a generally C-shaped cross section just as the casing 6 shown in FIG. 4. Namely, the outer circumferential surface of the casing 52 has arcuate surface portions 53 on both sides thereof, and a flat surface portion 54 in the central part of the casing 52. The flat surface portion 54 of the casing 52 is provided with bolt bores 56 which extend perpendicularly to the flat surface portion 54 and used for fixing a housing 55 thereto. The arcuate surface portions 53 of the casing 52 constitute support surfaces 53 for the housing 55. In the ball spline 50, the axis of the ball spline shaft 3 and that of a circular bore 47 of the housing 55 are also offset from each other as shown in FIG. 16, so that the area of the support surface 53 for the housing 55 can be made large. The casing 52 is provided, in the portions of its inner surface which are opposed to raceway grooves 2 in the ball spline shaft 3, with V-shaped or arcuate raceway grooves which extend in the axial, i.e. longitudinal direction thereof. The raceway grooves are formed by using the flat surface portion 54 of the casing 52 as a working reference plane. The casing 52 is provided with longitudinally extending return bores, which constitute return passages for balls 7, and extends in parallel with the raceway grooves. The casing 52 is further provided, in both of its longitudinal end surfaces 57, with bores into which bolts 60 are screwed to fix end caps 58 and side seals 59 to the casing 52.

Figure 16:
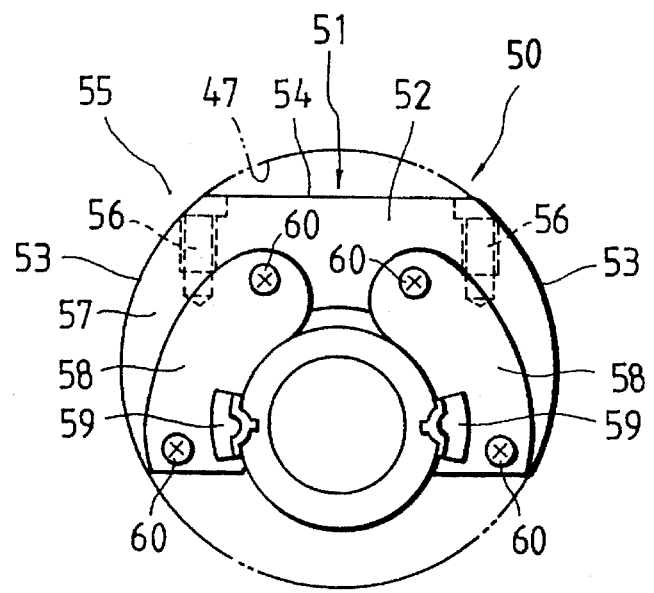
FIG. 16 is a side view showing the ball spline of FIG. 15.

One set of end caps 58 in the ball spline 50 are formed by a pair of arcuate members as shown in FIG. 16 which are made of a material, such as a synthetic resin or a metal. The inner sides of the end caps 58, i.e. the surfaces which contact the casing 52 have wall surfaces (not shown) having semi-circular cross sections (not shown) defining direction change passages. The outer sides, i.e. the surfaces of the end caps 58 on the opposite side of the casing surface are provided with locking recesses, with which locking portions of a retainer strip 8 for retaining balls can be engaged. The outer sides of the end caps 58 are also provided with recesses to which a retainer plate 28 is fixed. Since the construction of these parts is identical with that of the corresponding parts of the first embodiment, descriptions thereof will be omitted. Bores into which the bolts 60 are inserted are provided in four positions of the end caps 58, and the end caps 58 can be fixed with the side seal 59 to the casing 52 by inserting the bolts 60 into these bores and tightening the same. The shape of the side seals 59 is substantially identical with that of the end caps 58.

Figure 17:
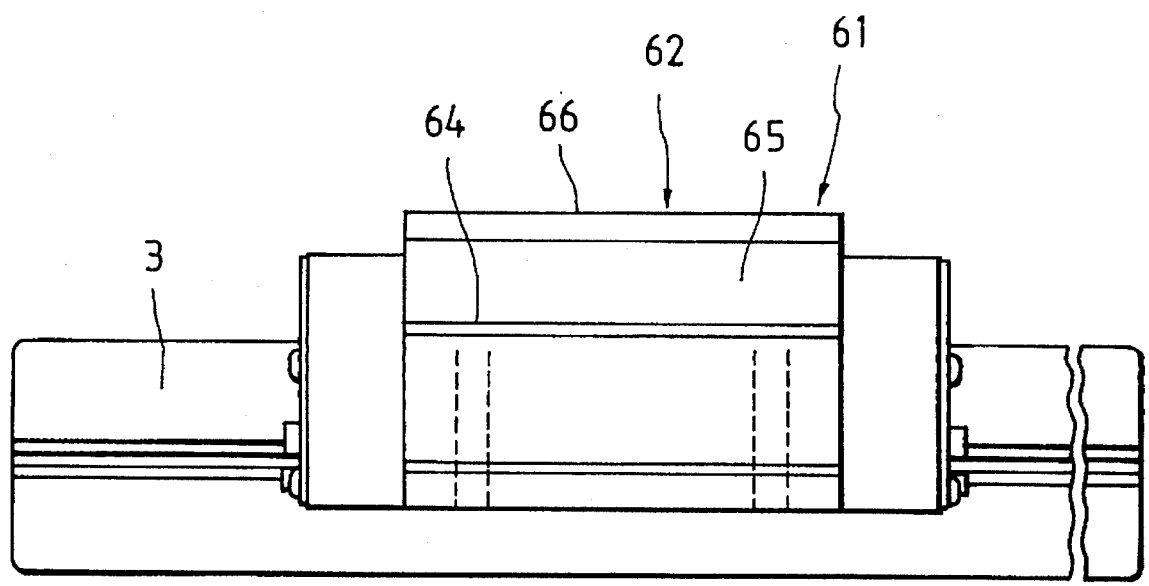
FIG. 17 is a front view showing a third embodiment of a ball spline according to the present invention.
Figure 18:
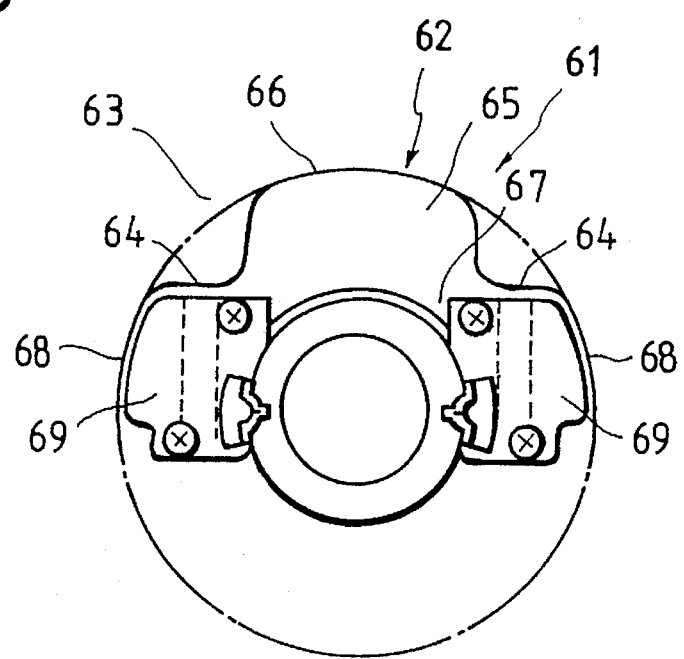
FIG. 18 is a side view showing the ball spline of FIG. 17.
Figure 19:
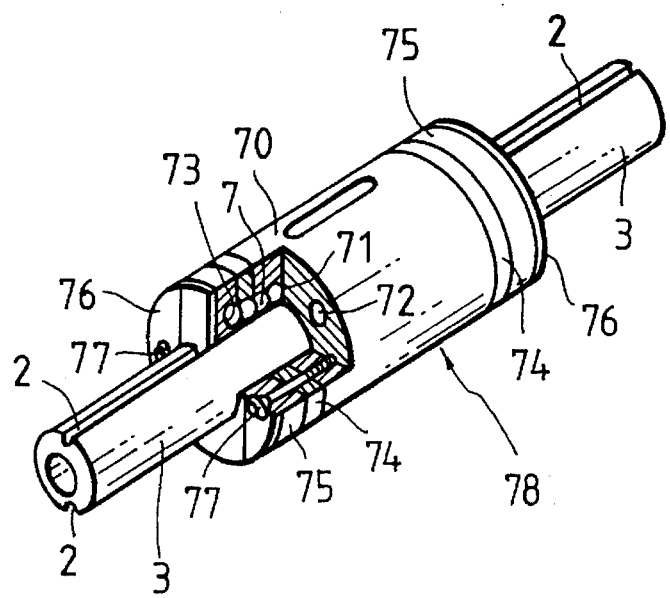
FIG. 19 is a partially cutaway perspective view showing an example of a conventional ball spline.
Figure 20:
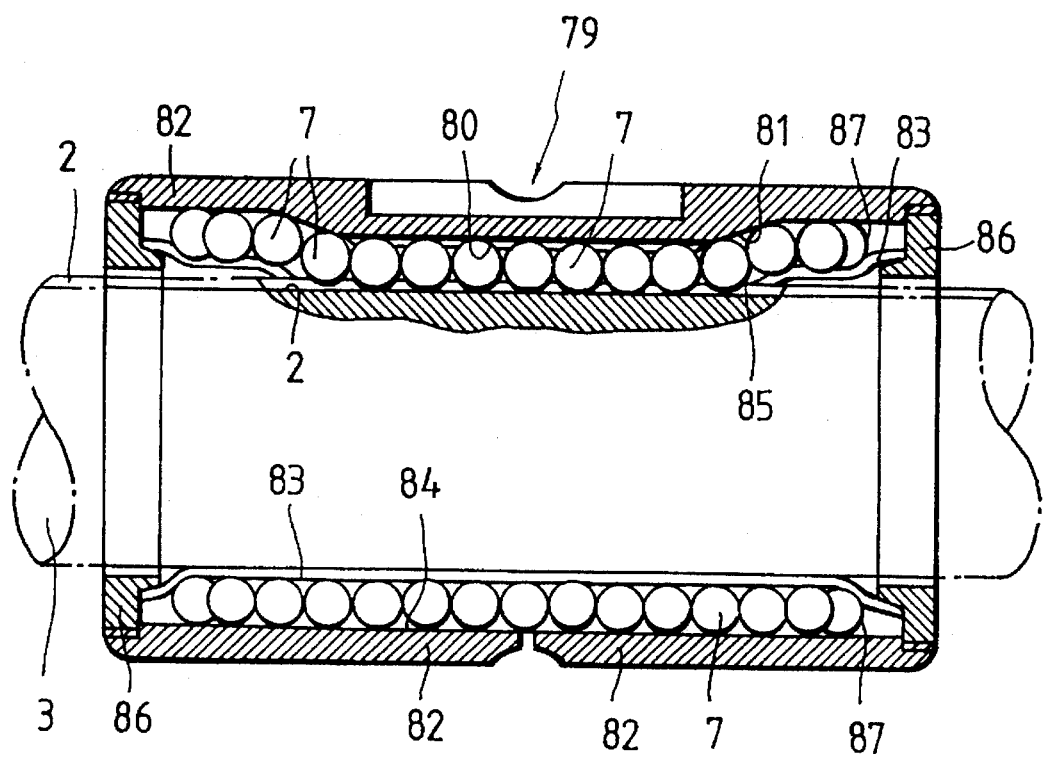
FIG. 20 is a partially cutaway section of another example of a conventional ball spline.
Figure 21:
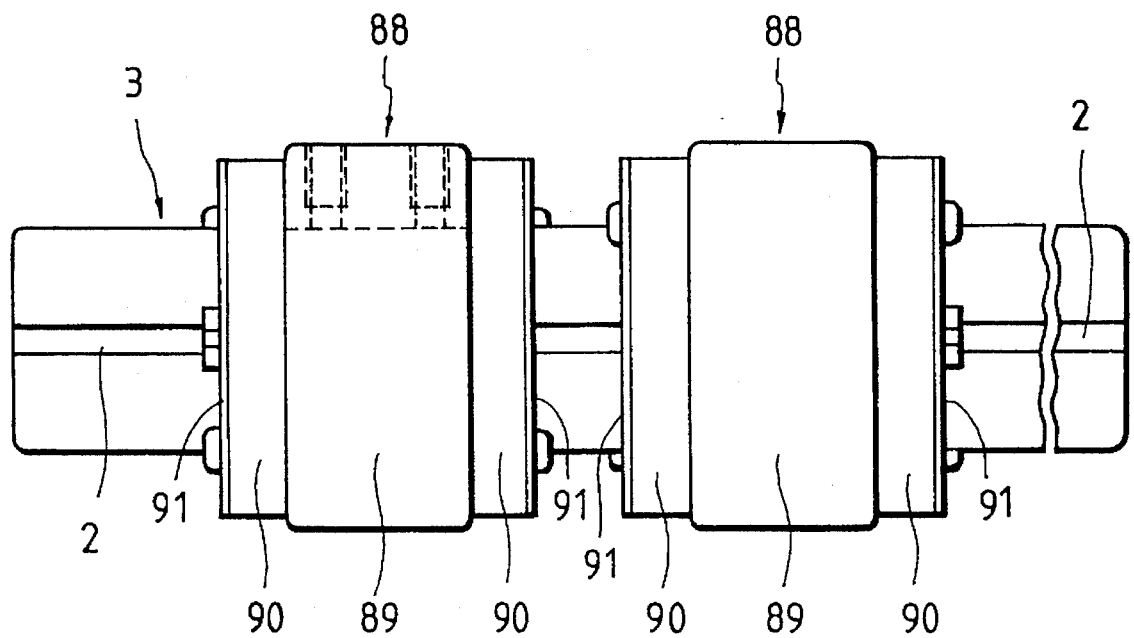
FIG. 21 is a front view showing still another example of a conventional ball spline.
Figure 22:
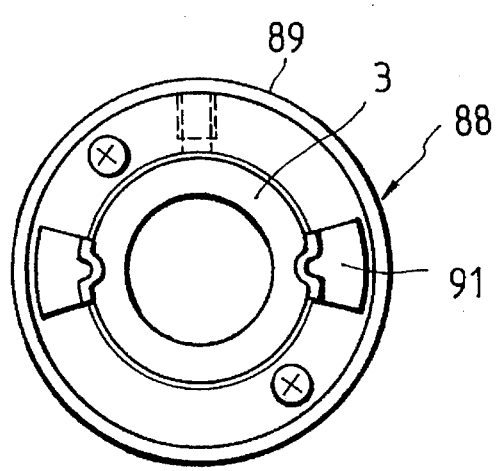
FIG. 22 is a side view showing the ball spline of FIG. 22.
Figure 23:
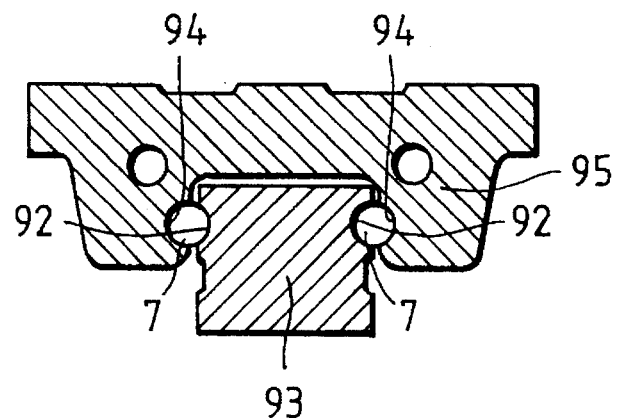
FIG. 23 is a sectional view showing a conventional linear rolling guide unit.

A third embodiment of the ball spline according to the present invention will now be described with reference to FIGS. 17 and 18. FIG. 17 is a front view showing a ball spline, and FIG. 18 a side view showing the ball spline of FIG. 17. Although the construction of a slider 62 of the ball spline 61 of this embodiment is different from that of the slider 12 of the first embodiment, the construction of a ball spline shaft 3 of the third embodiment is identical with that of the corresponding part of the first embodiment.

The ball spline 61 does not differ from a conventional ball spline in that the axis of the ball spline shaft 3 and the axis of the circular bore of a housing 63 are aligned but the former differs from the latter in that a support member 65 is provided on the flat portion 64 which constitute a working reference plane. The support member 65 is so formed that the outer surface thereof extends as an arcuate surface 66.

The outer surface of the casing 67 also has arcuate surface portions 68. Since the arcuate surface portion 68 of the casing 67 and the arcuate surface 66 of the support member 65 support the housing 63, the areas of the support surfaces 66, 68 for the housing 63 can be made large. The support member 65 may be produced as a separate member and fixed to the flat surface 64 of the casing 67, or it may be formed integrally with the casing 67.

The ball spline of this embodiment is slightly different from the ball spline of the second embodiment with respect to the shapes of the casing 67 and side seals 69 due to the alignment of the axis of the ball spline shaft 3 with the axis of the circular bore of the housing 63, but the other parts of the third embodiment are identical with the corresponding parts of the ball splines of the first and second embodiments. Accordingly, the descriptions of these parts will be omitted.

What is claimed is:

1. A ball spline comprising, a ball spline shaft of circular cross-section provided with a pair of first raceway grooves extending longitudinally in the outer surface of the ball spline, a casing fitted on said ball spline shaft and provided with second raceway grooves extending longitudinally in the inner surface of said casing in such a way as to be opposed to said first raceway grooves, and return bores spaced from said second raceway grooves, rolling elements rolling between said first and second raceway grooves, retainers retaining said rolling elements in cooperation with said casing.

end caps which have direction change passages communicating with said second raceway grooves and said return bores, and which are provided on both ends of said casing, side seals provided on end surfaces of said end caps, a slider which slides on and relatively to said ball spline shaft and comprises said casing, said rolling elements, said retainers, said end caps and said side seals, said casing being provided therein with an opening extending over the full longitudinal length so that said casing saddles said ball spline shaft, and the outer surface of said casing which is on the opposite side of said opening being provided with a pro-working reference plane which is used when said second raceway grooves are formed.

2. A ball spline according to claim 1, wherein said first raceway grooves formed in said ball spline shaft are so formed as to diametrically oppose to each other.

3. A ball spline according to claim 1, wherein said second raceway grooves in said casing are formed by surface grinding.

4. A ball spline comprising, a ball spline shaft provided with a pair of first raceway grooves extending longitudinally in the outer surface thereof, a casing fitted on said ball spline shaft and provided with second raceway grooves extending longitudinally in the inner surface thereof in such a way as to be opposed to said first raceway grooves, and return bores formed inside thereof and spared from said second raceway grooves, rolling elements rolling between said first and second raceway grooves, retainers retaining said rolling elements in cooperation with said casing, end caps which have direction change passages communicating with said second raceway grooves and said return bores, and which are disposed on both ends of said casing, side seals provided on end surfaces of said end caps, a slider which slides on and relatively to said ball spline shaft and comprises said casing, said rolling elements, said retainers, said end caps and said side seals, said casing being provided therein with an opening extending over the full longitudinal length thereof so that said casing saddles said ball spline shaft, the outer surface of said casing which is on the opposite side of said opening being provided with a working reference plane which is used when said second raceway grooves are formed, and a hollow housing provided with a through bore for fixedly fitting said casing, arcuate surfaces on both sides of the outer surface of said casing being supported by the inner surface of said through bore of said housing, and said arcuate surfaces being extended on both sides of said housing along the axis of said housing.

5. A ball spline according to claim 4, wherein the axis of said ball spline Shaft and that of said through bore of said housing are offset from each other.

6. A ball spline according to claim 4, wherein the axis of said ball spline shaft and that of said through bore of said housing are aligned with each other, said working reference plane being provided, on the central part thereof, with a support portion supported on the inner circumferential surface of said through bore of said housing.

7. A ball spline according to claim 4, wherein said second raceway grooves provided in said casing are formed by surface grinding.

8. A ball spline according to claim 4, wherein said ball spline shaft has a circular cross section, said first raceway grooves formed in said ball spline shaft are so formed as to diametrically oppose to each other.

* * * * *